(12) United States Patent
Roach et al.

(10) Patent No.: US 11,274,853 B2
(45) Date of Patent: Mar. 15, 2022

(54) ADDITIVELY MANUFACTURED HEATERS FOR WATER SYSTEM COMPONENTS

(71) Applicant: Goodrich Corporation, Charlotte, NC (US)

(72) Inventors: Kevin Edward Roach, Stow, OH (US); Maureen Elkins, Akron, OH (US); Joseph Winesdoerffer, Canton, OH (US)

(73) Assignee: Goodrich Corporation, Charlotte, NC (US)

( * ) Notice: Subject to any disclaimer, the term of this patent is extended or adjusted under 35 U.S.C. 154(b) by 441 days.

(21) Appl. No.: 16/160,417

(22) Filed: Oct. 15, 2018

(65) Prior Publication Data

US 2020/0116388 A1  Apr. 16, 2020

(51) Int. Cl.
| | |
|---|---|
| *H05B 3/06* | (2006.01) |
| *H05B 3/16* | (2006.01) |
| *H05B 3/46* | (2006.01) |
| *H05B 3/58* | (2006.01) |
| *F24H 1/14* | (2006.01) |
| *F24H 9/06* | (2006.01) |
| *B33Y 80/00* | (2015.01) |
| *F24H 9/00* | (2022.01) |
| *H05B 3/12* | (2006.01) |

(52) U.S. Cl.
CPC .............. *F24H 1/142* (2013.01); *B33Y 80/00* (2014.12); *F24H 9/00* (2013.01); *H05B 3/06* (2013.01); *H05B 3/12* (2013.01); *H05B 3/16* (2013.01); *H05B 3/46* (2013.01); *H05B 3/58* (2013.01); *F24H 9/06* (2013.01); *H05B 2203/013* (2013.01); *H05B 2203/021* (2013.01)

(58) Field of Classification Search
None
See application file for complete search history.

(56) References Cited

U.S. PATENT DOCUMENTS

| | | | | |
|---|---|---|---|---|
| 7,049,560 | B2 * | 5/2006 | Fukuda | H05B 3/34 |
| | | | | 219/549 |
| 9,161,393 | B2 | 10/2015 | Kaiserman et al. | |
| 9,560,697 | B2 | 1/2017 | Junghans et al. | |
| 9,939,087 | B2 | 4/2018 | Kolarski et al. | |
| 2006/0138121 | A1 | 6/2006 | Werkman et al. | |
| 2007/0007267 | A1 | 1/2007 | Rayl et al. | |
| 2010/0065543 | A1 * | 3/2010 | Dubey | H05B 3/34 |
| | | | | 219/213 |
| 2016/0312924 | A1 * | 10/2016 | Kolarski | F16L 53/37 |
| 2017/0158898 | A1 | 6/2017 | Xiao et al. | |
| 2017/0181226 | A1 | 6/2017 | Muehlnikel et al. | |

(Continued)

FOREIGN PATENT DOCUMENTS

| | | |
|---|---|---|
| EP | 1367859 A2 | 12/2003 |
| WO | WO2017005662 A1 | 1/2017 |

OTHER PUBLICATIONS

Extended European Search Report for EP Application No. 19203375. 1, dated Mar. 6, 2020, pp. 11.

*Primary Examiner* — Joseph M. Pelham
(74) *Attorney, Agent, or Firm* — Kinney & Lange, P.A.

(57) ABSTRACT

A heater for an aircraft component includes a plurality of layers of an additively manufactured conductive ink. The conductive ink is printed on the heater surface, either on a substrate or directly. The heater is protected by a closeout material.

16 Claims, 7 Drawing Sheets

(56) References Cited

U.S. PATENT DOCUMENTS

| | | | |
|---|---|---|---|
| 2017/0203511 A1* | 7/2017 | Burkhart | H01L 21/67017 |
| 2018/0063886 A1 | 3/2018 | Shearer et al. | |
| 2018/0094434 A1 | 4/2018 | Gillissen et al. | |
| 2018/0186460 A1* | 7/2018 | Dardona | H05B 3/262 |
| 2018/0213604 A1 | 7/2018 | Soppelsa et al. | |
| 2018/0231479 A1* | 8/2018 | Sandiford | G01J 5/10 |
| 2019/0060583 A1* | 2/2019 | Avuthu | A61M 5/445 |
| 2020/0017231 A1* | 1/2020 | Rhoden | F28D 7/106 |
| 2020/0018421 A1* | 1/2020 | Shugrue | F16K 7/14 |
| 2020/0049415 A1* | 2/2020 | Schiffres | B33Y 10/00 |
| 2020/0103288 A1* | 4/2020 | Mullen | B33Y 80/00 |
| 2020/0120760 A1* | 4/2020 | Hu | H05B 3/145 |
| 2020/0215724 A1* | 7/2020 | Capobianco | D01D 1/00 |

\* cited by examiner

ADDITIVELY MANUFACTURED HEATERS FOR WATER SYSTEM COMPONENTS

BACKGROUND

This application relates generally to water system component heaters, and specifically to additively manufactured heaters.

A variety of water system components require heating to prevent freezing of water in the system, in addition to temperature regulation. Current water system component heater elements are made of either metal wire or etched metal. Metal wire based heaters are generally fixed in geometry, and etched metal heaters require extensive processing. Additionally, incorporation of wires for electrical connection into these types of heaters requires additional processing.

SUMMARY

In one embodiment, an assembly includes a tube for a water system, an additively manufactured heater on the tube comprising a plurality of layers of a conductive ink, and one or more connectors from the heater to an electrical source.

In a second embodiment, an assembly includes a water system component selected from the group consisting of water valves and water tanks, an additively manufactured heater on the component comprising a plurality of layers of a conductive ink, and one or more connectors from the heater to an electrical source.

In a third embodiment, an assembly includes a water system component, an additively manufactured heater on the component having a resistance between 0.4-1 watts per square inch, one or more connectors from the heater to an electrical source, and a controller configured to regulate the additively manufactured heater. The additive manufactured heater includes a substrate and a plurality of layers of a conductive ink thereon.

DETAILED DESCRIPTION

Disclosed herein are additively manufactured heaters designed and printed for aircraft components needing heating, for example, water system components such as tubes and tanks. These additively manufactured heaters can be printed onto stretchable (or fabric) substrates, which can conform to the geometric shape of the surface of the component to which it is applied. For example, additively manufactured heaters can be applied to conduits such as rigid tubes or flexible hoses, valves, water tanks, or components with complex surface shapes.

Figure 1:
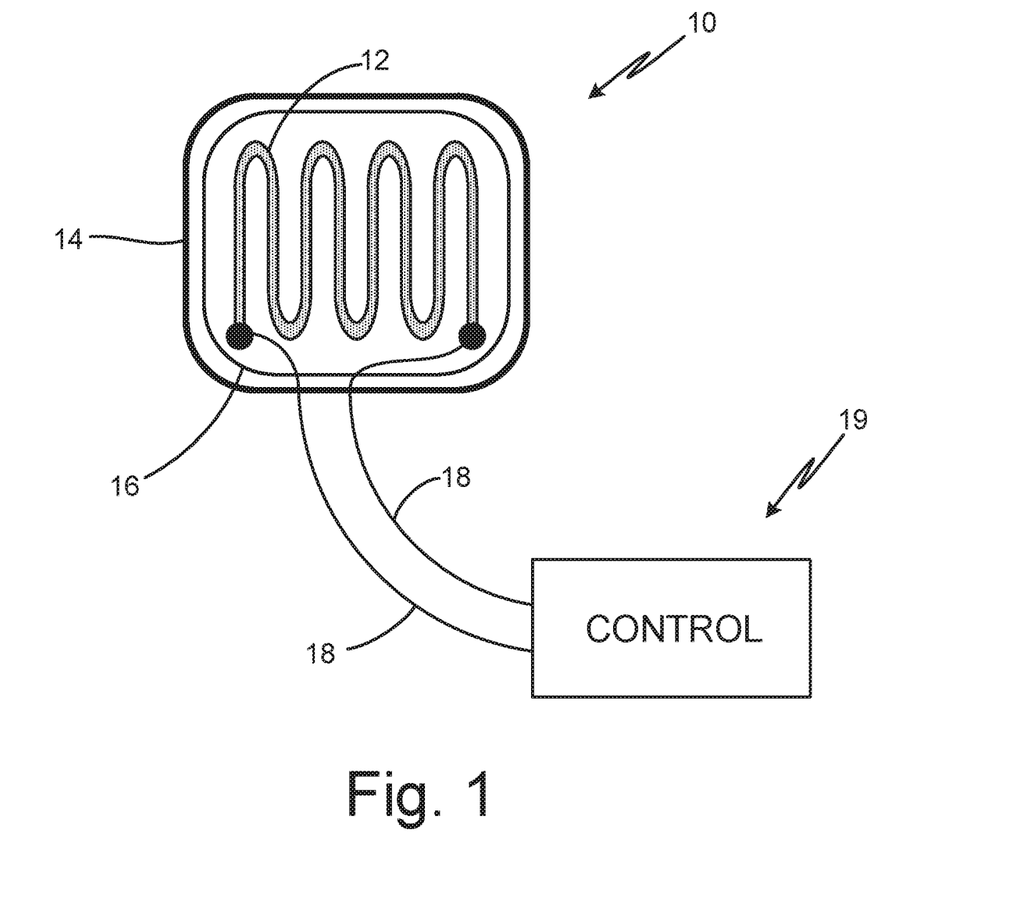
FIG. 1 is a schematic diagram of an additively manufactured heater.

FIG. 1 is a schematic diagram of additively manufactured heater 10, which generates heat because of an electric current passed through it. Heater 10 includes conductive ink 12 on substrate 14 cover by closeout material 16. Conductive ink 12 is electrically connected by leads 18 to controller 19.

Heater 10 is a three-dimensionally additively manufactured device made of conductive ink 12 with a resistance range of 5 to 15 W per foot for conduit (hose or tube) applications, or a resistance range between 0.4 to 40 W per square inch for applications on flat or variable 3-D components, depending on the size and specific application of heater 10. Conductive ink 12 can have a thickness between approximately 0.0001 inches and 0.010 inches.

Conductive ink 12 makes up the additively manufactured, heating portion of heater 10. Conductive ink 12 can be a carbon loaded, nano-carbon loaded, silver-loaded, or nano-silver loaded ink and can be up to 70% loaded with carbon (or silver) particles. In other embodiments, conductive ink 12 can be up to 60% loaded, or at least up to 50% loaded. Conductive ink 12 can be, for example, commercially available inks such as Loctite® CT 5030, Loctite® Ablestik® 8008MD, Loctite® EDAG 6017SS, or Loctite® EDAG 725A from Loctite, Bonderite® S-FN 109 available from Henkel, DuPont® PE671, DuPont® PE873, or DuPont® PE410 from DuPont USA.

Alternatively, conductive ink 12 can be a positive temperature coefficient (PTC) ink. PTC heaters are self-regulating heaters that run open-loop without any external diagnostic controls. Positive temperature coefficient heaters come to full power and heat up quickly to optimum temperature, but as heat increases, power consumption drops. This dynamic type of heater is effective and time and energy efficient. Thus, heater 10 made with PTC conductive ink 12 does not require an outside temperature control. Examples of PTC inks include DuPont® 7292 available from DuPont or Loctite ECI 8001 from Henkel.

The conductive ink 12 of heater 10 is formulated to allow highly detailed precision printing, and maintain a high resistance without bleeding between adjacent additively manufactured lines. Conductive ink 12 is additively manufactured onto heater 10 through a printing process such as screen printing, ink-jet, aerosol-jet printing, or other processes known to provide similar printing capabilities. Conductive ink 12 can be in a ribbon, grid, or other shape appropriate for a heating element.

Substrate 14 can be, for example, a flexible or stretchable substrate on which conductive ink 12 is additively manufactured Appropriate materials include neoprene, nylon fabric, glass fabric, pre-impregnated fabric (containing a resin), urethane, or other similar materials. Alternatively, heater 10 conductive ink 12 can be additively manufactured directly onto the surface of the component which heater 10 will service.

Conductive ink 12 is sealed to substrate 14 (or the surface of the component) by closeout material 16, which protects heater 10 from external contaminants and electrical contact with other components or objects. Closeout materials can include neoprene, nylon fabric, glass fabric, pre-impregnated fabrics, urethane, or other materials that will electrically isolate conductive ink 12 from the external environment. Alternatively, closeout material 16 can be a coating instead of a protective layer. In the case of a coating, painted on layers, conformal coatings, polyurethane, nitrile, PVC, neoprene, epoxies, parylene, or other dipped coatings can be used.

In either case, leads 18 create an electrical connection between conductive ink 12 and controller 19, which can act as an electrical source to heater 10. Leads 18 can be conventional wires, or can be additively manufactured along with conductive ink 12. Leads 18 allow for passage of electricity through heater 10, which generates heat via resistive heating due to the electric current.

Controller 19 is in communication with heater 10 via electrical leads (distinct from the leads that provide power to heater 10). Controller 19 can turn heater 10 ON or OFF. Optionally, controller 19 can collect temperature data through a thermocouple or other temperature sensor applied to the substrate, or another location within the assembly.

In operation, heater 10 converts electrical input to thermal output on the surface of substrate 14 to heat the component on which heater 10 rests. Additively manufactured heater 10 can also be applied to geometrically complex surfaces. Heater 10 can be applied to, but is not limited to, hoses, tubes, panels, tanks, valves, or other composite or metallic components for use in aircraft water systems including components that are heated in use.

Heater 10 can be manufactured, for example, on a stretchable substrate such as substrate 14. Stretchable substrate 14 must be able to conform to the curvature of the component surface to which heater 10 will be applied. The materials for substrate 14 are discussed above. In some instances, the substrate must be cleaned or cured before printing using conventional curing methods.

Substrate 14 must be compatible with both the component and conductive ink 12 used to make the heater and can be a non-conductive substrate material. For instance, stretchable substrate 14 must be able to withstand heating occurring with the component, and maintain adhesion to the component. Additionally, stretchable substrate 14 should be erosion resistant (particularly for applications where wear and incidental contact are plausible) and/or have elastic properties so that heater 10 on stretchable substrate 14 stays on the component for the component lifetime. This is highly dependent on the specific component and conductive ink 12 chosen.

Next, conductive ink 12 is additively manufactured onto substrate 14 to form or make layers of heater 10. Examples of commercially available conductive inks are discussed above. Typically, ink-jet, aerosol-jet, or screen printing can be used depending on the type of ink conduit, desired layer thickness, and dimensions of heater 10. For two-dimensional printing on a substrate using screen-printing, the screen specifications such as mesh count, size, and material are selected based on conductive ink 12 being used, the desired thicknesses of conductive ink 12 required to be additive manufactured, and the substrate to be additive manufactured on. In some instances, multiple applications of conductive ink 12 are needed to reach the desired thickness.

For ink-jet and aerosol-jet methods, the print head should be moveable at least on (x, y, z) axes and programmable with the geometric pattern specific to the component on which heater 10 will be applied. The specific print heat and additively manufacturing method will be dependent on the exact ink formulations and requirements set forth by the manufacturer of the ink. Ink-jet and aerosol-jet printers and printing heads can be utilized for two dimensional applications, such as printing on a substrate, but ideally can be adapted to enable three dimensional (three dimensional) printing capabilities by attaching the printing heads onto a numerically controlled robotic arm. In some cases, the component on which the conductive ink is being additively manufactured can be moved as the robotic arm is applying the ink. For example, three dimensional ink-jet and aerosol-jet printing equipment developed by Ultimaker (three-dimensional ink-jet equipment) or Optomec (three dimensional aerosol-jet equipment) can be used. For ink-jet or aerosol-jet methods, the printing head temperatures, flow rates, nozzle sizes are also selected based on the conductive ink being additive manufactured, required conductive ink thickness, and substrate to be additive manufactured on.

The printing is accomplished in an additive manner, meaning the print head takes one or more passes before a desired element resistance is reached in the desired geometric pattern and desired dimensions, which matches the curvature of the component. Alternatively, substrate 14 can be a rigid substrate already shaped so that it conforms to the geometric surface of the component to which it will be applied. In this case, the additive manufacturing of conductive ink 12 must follow a three-dimensional print pattern.

Conductive ink 12 of additively manufactured heater 10 may have a thickness of approximately between 0.0001"-0.010". Multiple passes are done by the print head when applying the conductive ink. Each layer deposited through individual passes of the print head should have a thickness of approximately 1-100 microns. Multiple passes allows for slow buildup of conductive ink 12 to the correct resistance and geometric pattern. Additionally, multiple passes allows for tailoring of conductive ink 12 on certain portions of the component surface. For instance, conductive ink 12 with a lower resistance (e.g., with a higher number of layers) and a greater thickness may be additively manufactured on a first portion of the component compared to a second portion of the component. A person skilled in the art of designing heaters will know how to select appropriate dimensions and geometries for the heater 10 based on the thermal properties of the materials used to construct the heater 10 and the requirements of the application for which heater 10 will be used.

After additively manufacturing the heater, conductive ink 12 is cured, and leads 18 are connected to conductive ink 12. The curing process of additively manufactured heater 10 depends on the type of conductive ink 12 used. In some instances, conductive ink 12 will air dry. In other instances, heat, infrared exposure, UV exposure, or other methods can be used to cure conductive ink 12.

After heater 10 is additively manufactured onto substrate 14, it may be closed out with a dielectric material, such as acrylic, neoprene, polyurethane, polyimide, silicone, or an epoxy-fiberglass matrix, to prevent erosion and electrical shorting. For example, closeout materials with high dielectric strength, such as polyimide (DuPont Kapton®), may only be required to be 0.001" thick while materials with lower dielectric strength, such as polyurethane or neoprene rubber, may be as thick as 0.015-0.030". Closeout material 16 can then be cured through conventional methods.

Finally, heater 10 may be applied to the component surface with an adhesive such as a cement adhesive, a pressure sensitive adhesive, or other adhesive means, depending on the component and environment requirements. The stretchable substrate 14 allows for conforming of heater 10 to curvature of the component surface without creating unnecessary stresses within heater 10. The use of a stretchable substrate 14 allows heater 10 to form to the shape of the surface of the component to which it is applied.

Alternatively, conductive ink 12 is additively manufactured directly onto the component surface. If conductive ink 12 is additive manufactured directly onto the component surface, the printing method used must allow for a print head that can move in three dimensions and navigate the geometry of the component surface while printing. Like the first method, the print head will make multiple passes until the resistance and thickness of heater 10 is correct. Methods such as screen printing, ink-jet or aerosol-jet printing can be used, the method would be selected based on the complexity of the shape on which heater 10 is being additive manufactured. In some instances, the component surface must be primed or prepared prior to printing of conductive ink 12. The printing process is similar to that described in reference to the first embodiment, but the print head in this embodiment follows a predetermined three-dimensional program to print on the surface of the component. Once additive manufactured, heater 10 must be electrically connected, closed out, and cured as discussed above.

In some instances, where the assembly surface is electrically conductive (metallic), this necessitates the use of an intermediary dielectric layer between the assembly and additively manufactured heater 10, such as a non-conductive ink like DuPont® BQ10 or ME777 available from DuPont USA, or an integrally bonded layer such as polyimide (Kapton® available from DuPont) or an epoxy-fiberglass. The typical thickness of a dielectric layer depends on the dielectric strength of the material and as a result may vary, typically between 0.0005" and 0.010" thick. The dielectric layer is not necessary for certain types of composite surfaces. This dielectric layer is thin, and acts as an insulator and adhesive between the component surface and the additively manufactured heater 10. The dialectic layer, like the stretchable substrate in the first embodiment, must be able to withstand temperatures, light, and other environmental factors so that additively manufactured heater 10 maintains its adhesion to the component.

In any method of additively manufacturing heater 10, heater 10 adheres to and matches the geometry of the surface of the component to which it is applied. This allows for greater fatigue resistance over the lifespan of the component and heater 10. Fatigue benefits result from heater 10 moving with the component on which it is printed; generally, additively manufactured heater 10 can attach directly to a component which results in a larger bend radius compared to prior art heaters. Moreover, multiple applications of heater 10 conductive ink allows for varying thickness and resistance of heater 10 as needed on the component. Printed ink heaters such as heater 10 have demonstrated themselves to be more fatigue resistant than metal foil heaters even in identical applications.

FIGS. 2-12 depict varying embodiments of the additively manufactured heater described with reference to FIG. 1. FIGS. 2-5 depict varying heaters applied to conduits (hoses or tubes), while FIGS. 6-12 depict aircraft components that are flat or have varying 3-D surface geometry. The components of FIGS. 6-12 can be water system components, such as tanks, valves, and panels, or other aircraft components requiring to be heated.

Figure 2:
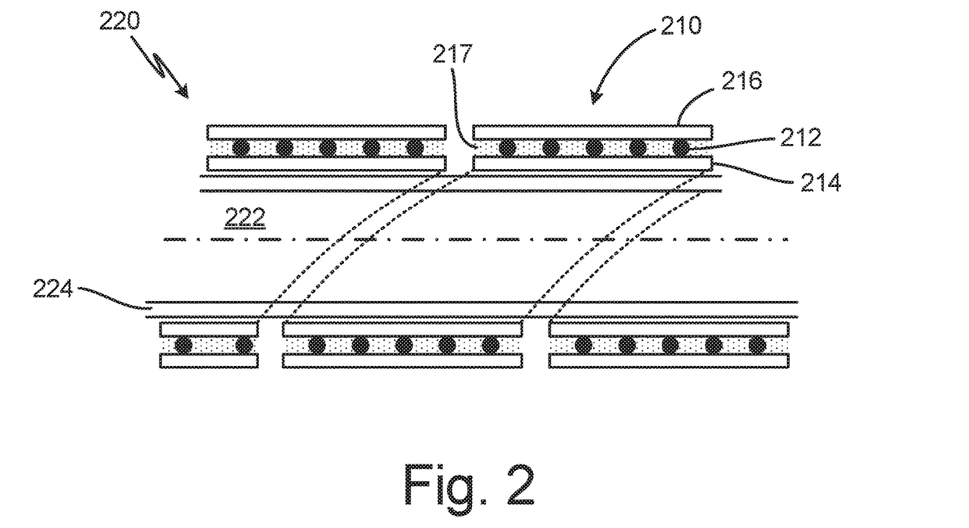
FIG. 2 is a schematic diagram of a conduit with an overwrap containing an additively manufactured heater and a non-conductive outer layer.

FIG. 2 is a schematic diagram of conduit 220 with additively manufactured heater 210 in the form of an overwrap. Overwrap heater 210 encircles conduit 220, and contains conductive ink 212, substrate 214, non-conductive closeout layer 216, and adhesive 217.

Overwrap heater 210 is made of conductive ink 212 on substrate 214. Conductive ink 212 is additively manufactured on flexible/stretchable substrate 214, and protected by closeout layer 216 attached by adhesive 217. Conductive ink 212 can be conductive with suitable resistance properties to act as a heater, and in some applications is self-regulating. For example, conductive ink 212 can be a carbon loaded, nano-carbon loaded, or nano-silver loaded ink as described in reference to FIG. 1. Heater 210 should have a power range of between 5 and 15 watts per foot.

Substrate 214 can be neoprene, nylon fabric, glass fabric, pre-impregnated fabric (containing a resin), urethane, or other similar materials that conform to the geometric surface of conduit 220. Substrate 214 can be a continuous sheet or strips that are made of a flexible or stretchable material capable of being wrapped around conduit 220 and that meets flammability requirements outlined by the Federal Aviation Administration (FAA). In the case of a continuous sheet, substrate 214 can be tightly wrapped around conduit 220. In the case of multiple strips of substrate 214, the individual strips can be spaced out along conduit 220 or overlapping. Alternatively, substrate 214 can be a continuous sheet that is spiral wound around conduit 220, leaving space or overlapping as needed.

Closeout layer 216 is a layer that electrically isolates conductive ink 212 on substrate 214 from the external environment, and can be attached to heater 210 with adhesive 217. Materials for closeout layer 216 are discussed with reference to FIG. 1. Adhesive 217 can be, for example, a pressure sensitive adhesive or a chemical adhesive such as epoxy.

Conduit 220 has center channel 222, through which fluid flows, and wall 224, around which heater 210 is wrapped. Conduit 220 can be, for example, a flexible hose made of a non-conductive material such as rubber, composite, or plastic material such as Teflon®, Nomex®, silicone, rubber, Kapton®, or PEEK. In this case, conductive ink 212 should be non-brittle, pliable, and stretchable. Conductive ink 212, then, should be able to adapt as flexible hose conduit 220 changes shape or fluid runs through conduit 220. In this case, substrate 214 should be thin, flexible, and stretchable so that it moves with the hose.

In a different embodiment, conduit 220 can be a rigid tube made of either a conductive (metallic) material or a non-conductive (non-metallic) material. In this case, conductive ink 212 does need to be non-brittle and pliable, but does not require as much stretch as an ink on a hose. Similarly, substrate 214 should be thin, flexible, capable of being wrapped around conduit 220, and meet flammability requirements for aircraft, but does not necessarily need to be stretchable. In the case of a conductive rigid tube, conductive ink 212 must be insulated from the conductive rigid tube by a coating, dielectric layer, or substrate 214.

In another embodiment, conduit 220 can be a thin walled rigid tube. The thin walled rigid tube can be either metallic or non-metallic. In this case, conducive ink 212 should be pliable and non-brittle. For thin walled rigid tubes, substrate 214 can be a thin, flexible, structurally reinforcing fabric.

Figure 3:
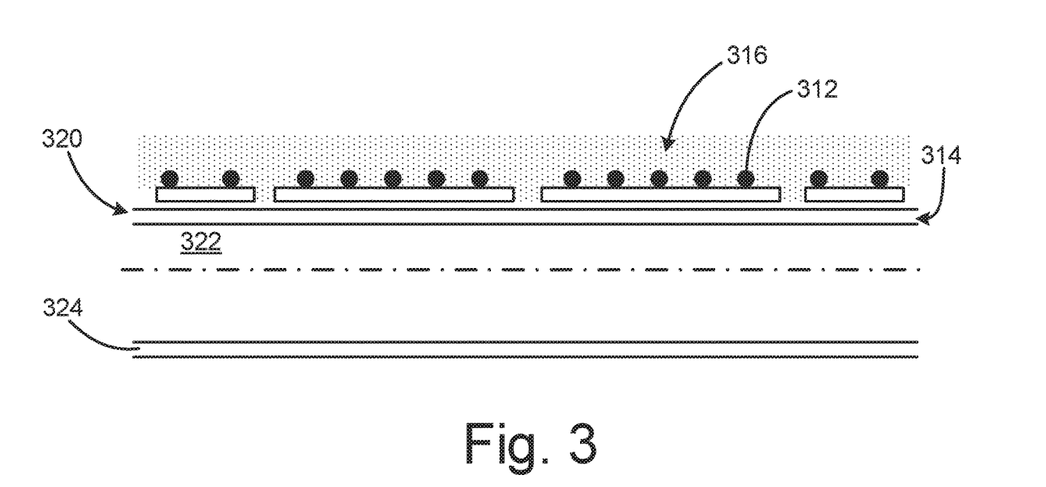
FIG. 3 is a schematic diagram of a conduit with an overwrap containing an additively manufactured heater and a non-conductive outer coating.

FIG. 3 is a schematic diagram of conduit 320 with additively manufactured heater 310 in the form of an overwrap. Overwrap heater 310 encircles conduit 320, and contains conductive ink 312, substrate 314, and closeout coating 316. Conduit 320 has center channel 322, through which fluid flows, and wall 324, around which heater 310 is wrapped. Heater 310, conductive ink 312, and substrate 314 are the same as the corresponding elements described in reference to FIG. 2.

Closeout coating 316 replaces the closeout layers in the embodiments described with reference to FIG. 2. Closeout coating 316 is non-conductive, protects conductive ink 312 from electrically shorting, and physically protects conductive ink 312 from mechanical forces. Closeout coating 316 can be, for example, conformal coatings, parylene, conathane, colysulfide, epoxies, or other suitable coatings.

Similar to the embodiments described in reference to FIG. 2, conduit 320 can be a non-conductive hose, a rigid tube that is conductive or non-conductive, or a thin-walled tube that is conductive or non-conductive. Substrate 314 and conductive ink 312 can vary accordingly.

Figure 4:
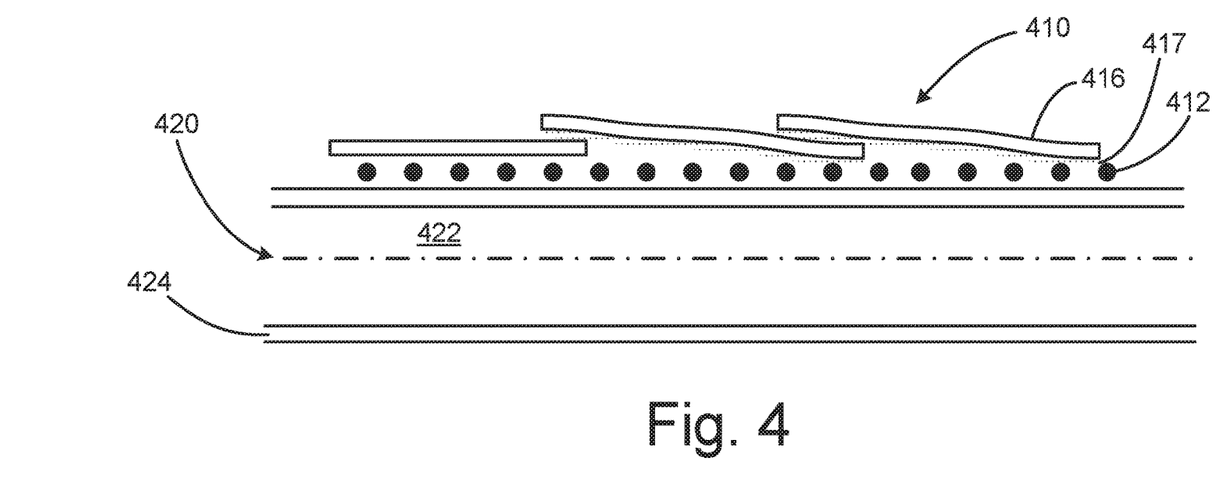
FIG. 4 is a schematic diagram of a conduit with a direct printed additively manufactured heater and an over-wrapped non-conductive layer.

FIG. 4 is a schematic diagram of conduit 420 with direct printed additively manufactured heater 410. Additively manufactured heater 410 contains conductive ink 412 and over-wrapped closeout layer 416 with adhesive 417. Conduit 420 has center channel 422, through which fluid flows, and wall 424, on which additively manufactured heater 410 is printed.

Heater 410 does not contain a substrate. Instead, conductive ink 412 can be printed directly onto conduit 420. In this embodiment, conduit 420 can be, for example, a non-metallic hose, non-metallic rigid tube, or non-metallic thin-walled tube. Importantly, conduit 420 is non-conductive to prevent electrical shorting.

Closeout layer 416 is a layer that electrically isolates conductive ink 412 on conduit 420 from the external environment, and can be attached to conduit 420 with adhesive 417. Closeout layer 416 acts as an overwrap layer, and wraps around conduit 420. Materials for closeout layer 416 are discussed with reference to FIG. 1. Adhesive 417 can be, for example, a pressure sensitive adhesive or a chemical adhesive such as epoxy.

Figure 5:
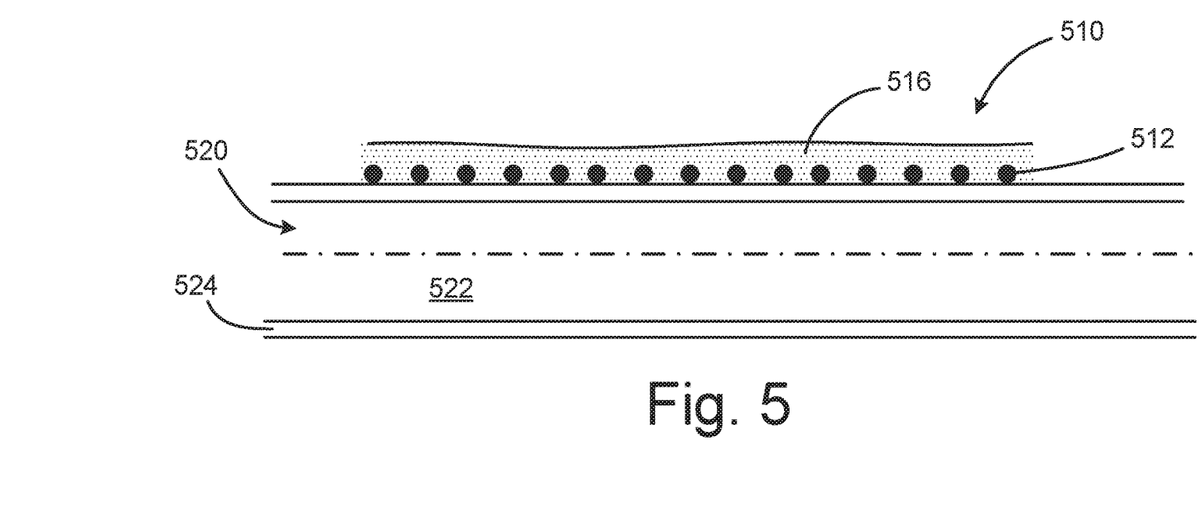
FIG. 5 is a schematic diagram of a conduit with a direct printed additively manufactured heater and a non-conductive coating.

FIG. 5 is a schematic diagram of conduit 520 with direct printed additively manufactured heater 510. Additively manufactured heater 510 contains conductive ink 512 and closeout coating 516. Conduit 520 has center channel 522, through which fluid flows, and wall 524, on which additively manufactured heater 510 is printed.

Like the embodiment in FIG. 4, heater 510 contains conductive ink 512 that is directly additively manufactured onto the surface of conduit 520. For this reason, heater 510 does not contain a substrate. In this embodiment, conduit 520 can be, for example, a non-metallic hose, non-metallic rigid tube, or non-metallic thin-walled tube. Importantly, conduit 520 is non-conductive to prevent electrical shorting.

Closeout coating 516 replaces the closeout layers in the embodiments described with reference to FIG. 4. Closeout coating 516 is non-conductive, protects conductive ink 512 from electrically shorting, and physically protects conductive ink 512 from mechanical forces. Closeout coating 516 can be, for example, conformal coating, parylene, conathane, polysulfide, epoxies, or other appropriate coatings.

Figure 6:
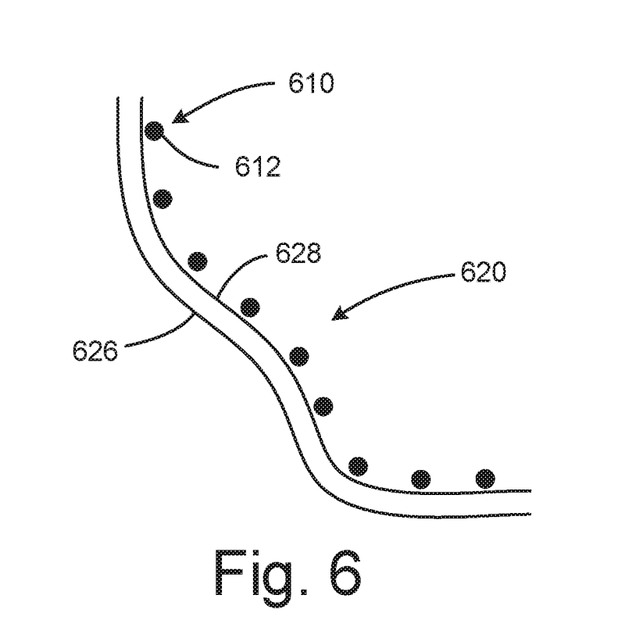
FIG. 6 is a schematic diagram of an interior aircraft panel having complex geometry with a direct printed additively manufactured heater.

FIG. 6 is a schematic diagram of interior aircraft panel 620 having complex geometry with direct printed additively manufactured heater 610. Heater 610 includes conductive ink 612.

Aircraft panel 620 has exterior side 626 and interior surface 628. Aircraft panel 620 is of a variable, complex surface geometry that is difficult to apply a flat heater to. For example, aircraft panel 620 can be a cylindrical tank, conformal tank, vessel, blade, vane, inlet, radome, or other aircraft interior part. In the case of an aircraft interior part, exterior side 626 would face the passengers or cabin of the aircraft.

Due to the complex shape of interior surface 628, conductive ink 612 is directly additively manufactured onto interior surface 628 with a print head capable of moving in three dimensions and applying the ink in the desired thickness and resistance range to interior surface 628. This process is described in detail with reference to FIG. 1.

Conductive ink 612 can be, as described with reference to FIG. 1, a conductive silver-filled or carbon-filled ink suitable for heating aircraft panel 620. Conductive ink 612 may have a power range of approximately 0.4-40 Watts per square inch. Conductive ink 612 is directly additively manufactured onto interior surface 628 of aircraft panel 620. Preferably, conductive ink 612 is non-brittle and pliable so that it can conform to the shape of aircraft panel 620 when applied through additive manufacturing.

Figure 7:
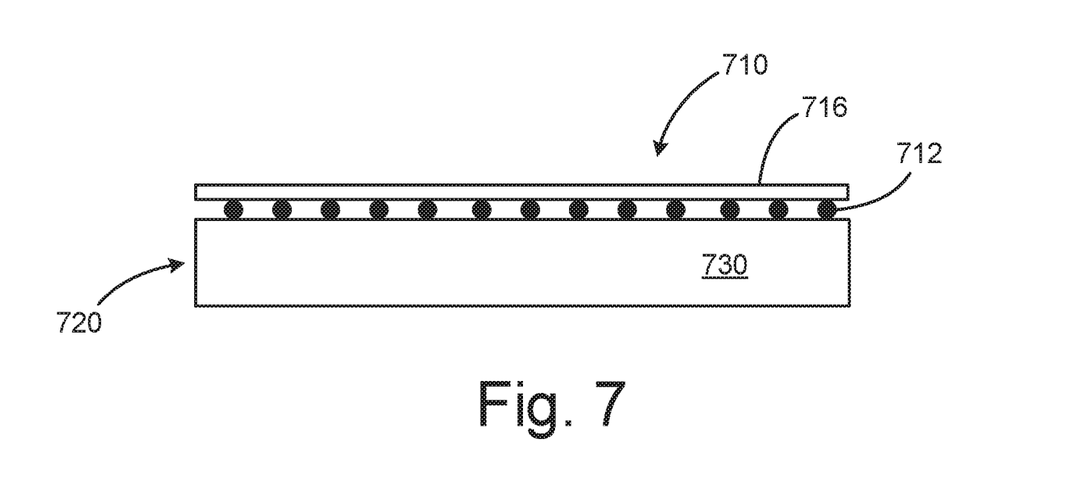
FIG. 7 is a schematic diagram of a flat aircraft panel with an additively manufactured heater.

FIG. 7 is a schematic diagram of flat aircraft panel 720 with additively manufactured heater 710. Heater 710 includes conductive ink 712 and closeout layer 716.

Flat aircraft panel 720 had a flat surface on which conductive ink 712 is directly additively manufactured. Alternatively, conductive ink 712 can be additively manufactured onto a substrate (not shown), and the substrate can be applied to the flat surface of aircraft panel 720. In this case, the substrate should be thin, flexible, and meet flammability requirements.

Closeout layer 712, similar to closeout layer 216 in FIG. 2, is a layer that electrically isolates conductive ink 712 from the external environment, and can be attached to heater 710 with an adhesive (not shown). Materials for closeout layer 716 are discussed with reference to FIG. 1. The adhesive can be, for example, a pressure sensitive adhesive or a chemical adhesive such as epoxy. Alternatively, conductive ink 712 can be protected by a closeout coating such as coating 616 described in reference to FIG. 6.

In heater 710, conductive ink 712 has a power range of 0.4-1.5 Watts per square inch. Conductive ink 712 acts as a heater and in some applications is self-regulating. Conductive ink 712 is non-brittle and pliable to allow additive manufacturing application to panel 720.

Figure 8:
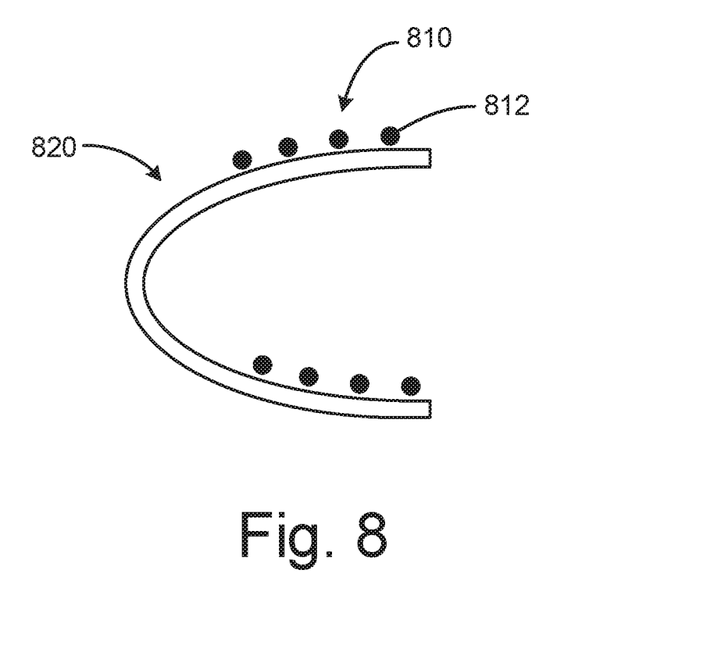
FIG. 8 is a schematic diagram of a curved aircraft component with a direct printed additively manufactured heater.

FIG. 8 is a schematic diagram of curved aircraft component 820 with direct printed additively manufactured heater 810 containing conductive ink 812.

Aircraft component 820 can be, for example, a water tank or engine inlet. Conductive ink 812 can be directly additively manufactured onto interior or exterior surfaces of component 820. If component 820 is a water tank, conductive ink 812 can be printed on an exterior surface to provide heating. In other embodiments, a thin, flexible substrate (not shown) can be used. The substrate would need to be adaptable to tight corners, such as edges or curves in component 820.

Alternatively, conductive ink 812 can be printed on an interior surface of component 820. In the case of a potable water tank, the conductive ink 812 can be used as a water level sensor on the interior surface. In this case, conductive ink 812 and a substrate, closeout material, or other adhesives, would need to be able to survive such an environment. Additionally, these materials should be compatible with drinking water if used in a potable water tank application.

Conductive ink 812 may have a power range of 0.4-40 Watts per square inch, and is conductive with suitable resistive property to act as a heater. In some cases, conductive ink 812 is self-regulating. Conductive ink 812 is both non-brittle and pliable to allow for additive manufacturing application to component 820 as described in reference to FIG. 1.

Figure 9:
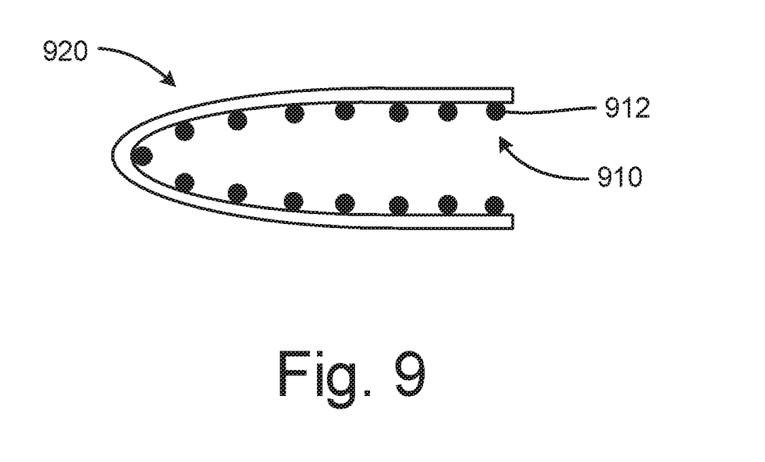
FIG. 9 is a schematic diagram of a narrow aircraft component with a direct printed additively manufactured heater.

FIG. 9 is a schematic diagram of narrow aircraft component 920 with direct printed additively manufactured heater 910 containing conductive ink 912.

Aircraft component 920 is a metal composite or other durable material suitable for an erosion shield or abrasion shield. Aircraft component 920 has a narrow finished cross-section. Conductive ink 912 can be printed directly onto the surface of component 920 either before or after processing and forming of component 920. Alternatively, conductive ink 912 can be printed onto a thin substrate (not shown), which is then applied to component 920.

Conductive ink 912 can have a power range between 0.4-40 Watts per square inch. Conductive ink 912 is a pliable, non-brittle ink that can be applied to the surface of component 920 through additive manufacturing methods described in reference to FIG. 1.

Figure 10:
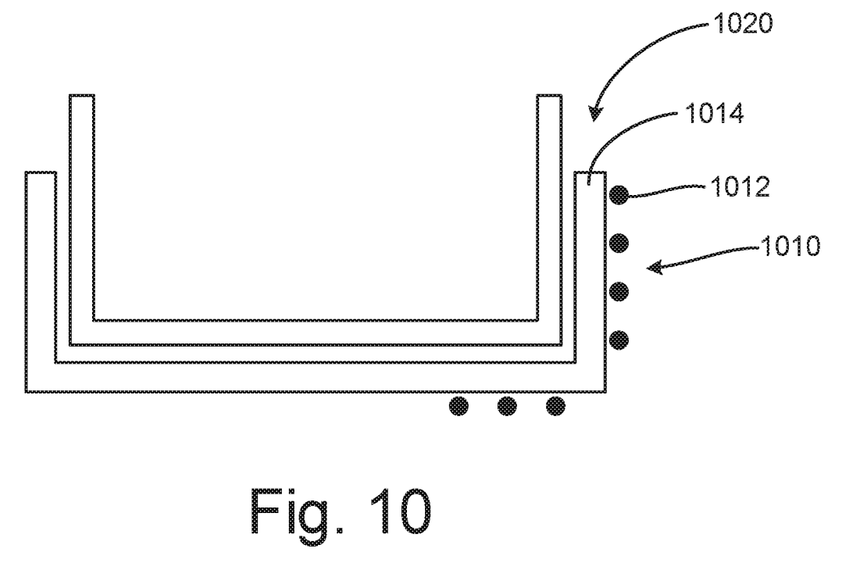
FIG. 10 is a schematic diagram of an aircraft component with sharp edges with an additively manufactured heater on a substrate.

FIG. 10 is a schematic diagram of aircraft component 1020 with sharp edges with additively manufactured heater 1010 on a substrate with conductive ink 1012 on substrate 1014.

Aircraft component 1020 can be, for example, a valve body having sharp edges. To allow for even heating of component 1020 around its sharp edges, conductive ink 1012 is additively manufactured onto substrate 1014. Substrate 1014 is adhered to component 1020, around the sharp corners.

Substrate 1014 is a conformable substrate with low "spring back" which allows it to follow the corners of component 1020. Substrate 1014 is thin, flexible, and meets flammability requirements.

Conductive ink 1012 on substrate 1014 may have a power range between 0.4-40 Watts per square inch. Conductive ink 1012 is a pliable, non-brittle ink that can be applied to the surface of component 1020 through additive manufacturing methods described in reference to FIG. 1.

Figure 11:
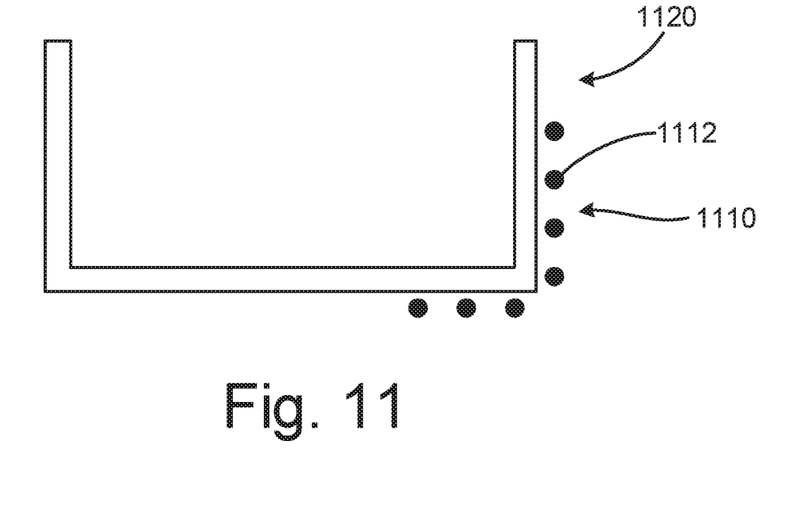
FIG. 11 is a schematic diagram of an aircraft component with sharp edges with a direct printed additively manufactured heater.

FIG. 11 is a schematic diagram of aircraft component 1120 with sharp edges with a direct printed additively manufactured heater 1110 with conductive ink 1112.

Aircraft component 1120 can be, for example, a valve body having sharp edges. In this embodiment, there is no substrate, and conductive ink 1112 is additively manufactured onto the surface of component 1120 as described with reference to FIG. 1. Conductive ink 1112 may have a power range between 0.4-40 Watts per square inch, and is a pliable, non-brittle ink.

Figure 12:
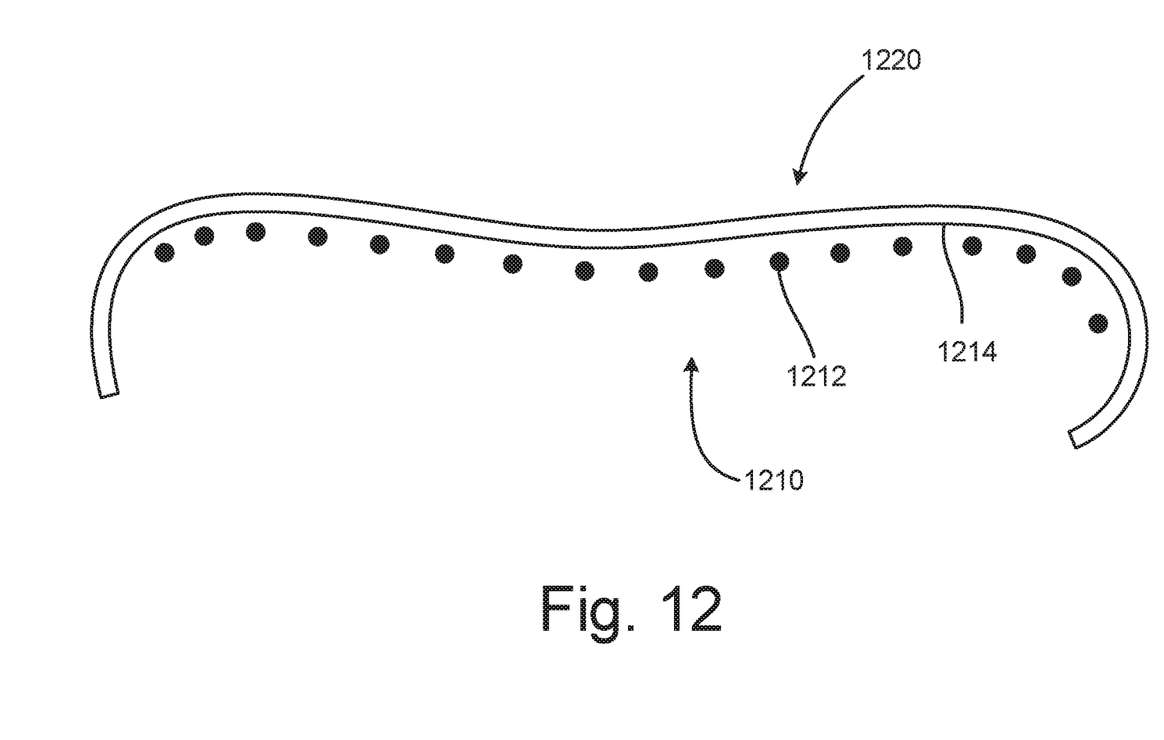
FIG. 12 is a schematic diagram of an additively manufactured heater on a fabric substrate.

FIG. 12 is a schematic diagram of assembly 1220 with additively manufactured heater 1210 with conductive ink 1212 on fabric substrate 1214.

Conductive ink 1212 is additively manufactured onto fabric substrate 1214, which can be, for example, seat upholstery or cloth covering for other surfaces in an aircraft. Alternatively, conductive ink 1212 can be printed onto thinner fabric (not shown) which is subsequently attached to the inside of more rugged upholstery material such as thick woven fabric, leather, or similar fabrics.

Conductive ink 1212 has a power range of 0.4-1 Watts per square inch, and is a conductive material with suitable resistive properties to act as a heater. Conductive ink 1212 is non-brittle, pliable, and stretchable so that it moves with fabric substrate 1214 as the fabric moves.

Additively manufactured heaters perform well in high stress environments. Additively manufacturing heaters onto flexible or stretchable substrates, followed by wrapping the substrate around a conduit allows for reduced weight and costs for heaters. Direct additively manufacturing onto the surfaces of components limits the amount of materials on the component surface, reducing weight and cost. Moreover, these types of additively manufactured heaters conform well to varying component surface geometries.

Discussion of Possible Embodiments

The following are non-exclusive descriptions of possible embodiments of the present invention.

An assembly includes a tube for a water system, an additively manufactured heater on the tube comprising a plurality of layers of a conductive ink, and one or more connectors from the heater to an electrical source.

The assembly of the preceding paragraph can optionally include, additionally and/or alternatively, any one or more of the following features, configurations and/or additional components:

The tube comprises a material selected from the group consisting of metallics, composites, and plastics.

The additively manufactured heater comprises an overwrap configured to fit around the tube.

The additively manufactured heater has a resistance between 5-15 watts per foot.

The additively manufactured heater has a thickness between 0.0001 inches and 0.010 inches.

Each of the plurality of layers of the conductive ink has a thickness between 1-100 microns.

The conductive ink is selected from the group consisting of nano-carbon loaded inks, carbon-loaded inks, and silver-loaded inks.

The additively manufactured heater further comprises a substrate on which the plurality of layers of the conductive ink resides.

The substrate is selected from the group consisting of neoprene, nylon fabric, glass fabric, pre-impregnated fabric, urethane, or can combinations thereof.

The plurality of layers of the conductive ink are printed directly onto a surface of the tube.

The assembly includes a closeout layer on the additively manufactured heater.

The closeout layer is selected from the group consisting of neoprene, nylon fabric, glass fabric, pre-impregnated fabrics, urethane, and combinations thereof.

The assembly includes a closeout coating on the additively manufactured heater.

The closeout coating is selected from the group consisting of paint, conformal coatings, polyurethane, nitrile, PVC, neoprene, epoxies, parylene, dipped coatings, and combinations thereof.

An assembly includes a water system component selected from the group consisting of water valves and water tanks, an additively manufactured heater on the component comprising a plurality of layers of a conductive ink, and one or more connectors from the heater to an electrical source.

The assembly of the preceding paragraph can optionally include, additionally and/or alternatively, any one or more of the following features, configurations and/or additional components:

The component has a surface with a complex geometric shape.

The additively manufactured heater has a resistance between 0.4-40 watts per square inch.

The component is a panel with a flat surface.

The additively manufactured heater has a resistance between 0.4-1.5 watts per square inch.

An assembly includes a water system component, an additively manufactured heater on the component having a resistance between 0.4-1 watts per square inch, one or more connectors from the heater to an electrical source, and a controller configured to regulate the additively manufactured heater. The additive manufactured heater includes a substrate and a plurality of layers of a conductive ink thereon.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An assembly comprises:
   a tube for a water system;
   an additively manufactured heater on the tube comprising a plurality of layers of a conductive ink, wherein each of the plurality of layers of the conductive ink has a thickness between 1-100 microns and the conductive ink is selected from the group consisting of nano-carbon loaded inks, carbon-loaded inks, and silver-loaded inks; and
   one or more connectors from the heater to an electrical source;
   wherein:
      the tube comprises a material selected from the group consisting of metallics, composites, and plastics;
      the additively manufactured heater comprises a flexible overwrap configured to fit around the tube;
      the additively manufactured heater has a varying thickness between 0.0001 inches and 0.010 inches and a varying resistance;
      the additively manufactured heater further comprises a flexible substrate on which the plurality of layers of the conductive ink resides, wherein the flexible substrate is configured to resist erosion and is selected from the group consisting of neoprene, nylon fabric, glass fabric, pre-impregnated fabric, urethane, or any combinations thereof; and
      the additively manufactured heater is configured to remain on the tube for the lifetime of the tube.

2. The assembly of claim 1, wherein the additively manufactured heater has a power between 5-15 watts per foot.

3. The assembly of claim 1, wherein the plurality of layers of the conductive ink are printed directly onto a surface of the tube.

4. The assembly of claim 1, further comprising a closeout layer on the additively manufactured heater.

5. The assembly of claim 4, wherein the closeout layer is selected from the group consisting of neoprene, nylon fabric, glass fabric, pre-impregnated fabrics, urethane, and combinations thereof.

6. The assembly of claim 1, further comprising a closeout coating on the additively manufactured heater.

7. The assembly of claim 6, wherein the closeout coating is selected from the group consisting of paint, conformal coatings, polyurethane, nitrile, PVC, neoprene, epoxies, parylene, dipped coatings, and combinations thereof.

8. An assembly comprises:
   a water system component selected from the group consisting of water valves and water tanks;
   an additively manufactured heater on the component comprising a plurality of layers of a conductive ink, wherein each of the plurality of layers of the conductive ink has a thickness between 1-100 microns, the additively manufactured heater has a varying thickness between 0.0001 inches and 0.010 inches and a varying resistance, the conductive ink is selected from the group consisting of nano-carbon loaded inks, carbon-loaded inks, and silver-loaded inks, the additively manufactured heater is configured to resist erosion, and the plurality of layers of conductive ink conforms to an external surface of the water system component; and
   one or more connectors from the heater to an electrical source;
   wherein the additively manufactured heater is configured to remain on the water system component for the lifetime of the water system component.

9. The assembly of claim 8, wherein the water system component has a surface with a complex geometric shape.

10. The assembly of claim 9, wherein the additively manufactured heater has a power between 0.4-40 watts per square inch.

11. The assembly of claim 8, wherein the water system component is a panel with a flat surface.

12. The assembly of claim 11, wherein the additively manufactured heater has a power between 0.4-1.5 watts per square inch.

13. An assembly comprises:
    a water system component;
    an additively manufactured heater on the component having a power between 0.4-1 watts per square inch, the additive manufactured heater comprising:
       a flexible substrate, wherein the flexible substrate is configured to resist erosion; and
       a plurality of layers of a conductive ink thereon, wherein the conductive ink is selected from the group consisting of nano-carbon loaded inks, carbon-loaded inks, and silver-loaded inks;
    one or more connectors from the heater to an electrical source; and
    a controller configured to regulate the additively manufactured heater;
    wherein each of the plurality of layers of the conductive ink has a thickness between 1-100 microns, the additively manufactured heater is configured to remain on the water system component for the lifetime of the water system component, and the additively manufactured heater has a varying thickness between 0.0001 inches and 0.010 inches and a varying resistance.

14. The assembly of claim 1, wherein the flexible substrate comprises individual strips that are spaced out along the tube or are overlapping.

15. The assembly of claim 1, wherein the flexible substrate is a continuous sheet that is spiral wound around the tube such that the continuous sheet does not overlap itself.

16. The assembly of claim 1, wherein the flexible substrate is a continuous sheet that is spiral wound around the tube such that the continuous sheet overlaps itself.

* * * * *